United States Patent [19]

Schuck

[11] 3,931,717
[45] Jan. 13, 1976

[54] MULTIPLE CABLE CHUTE
[75] Inventor: Paul R. Schuck, Davenport, Iowa
[73] Assignee: J. I. Case Company, Racine, Wis.
[22] Filed: Sept. 16, 1974
[21] Appl. No.: 506,669

[52] U.S. Cl. .................. 61/72.6; 37/193; 172/40; 172/101
[51] Int. Cl.² .......................................... E02F 5/02
[58] Field of Search ......... 61/72.1, 72.6, 72.7, 72.3, 61/72.4; 172/40, 101; 37/193

[56] References Cited
UNITED STATES PATENTS

| 3,300,989 | 1/1967 | Reising | 61/72.6 |
|---|---|---|---|
| 3,363,423 | 1/1968 | Davis | 61/72.6 |
| 3,417,571 | 12/1968 | Kelley | 61/72.6 |

FOREIGN PATENTS OR APPLICATIONS

| 547,318 | 8/1942 | United Kingdom | 61/72.6 |
|---|---|---|---|
| 1,201,441 | 9/1965 | Germany | 61/72.6 |

*Primary Examiner*—Dennis L. Taylor

[57] ABSTRACT

A cable guiding chute suitable for attachment to a ground slitting blade to dispense a plurality of cables includes a pair of generally vertical sidewall members, forward and trailing webs extending between the sidewall members to define a cable passageway, and a plurality of generally J-shaped separators extending the length of the passageway to define a plurality of cable guiding conduits. One of the sidewall members is releaseably secured to the forward and trailing webs and may be removed to expose the cable guiding conduits for lateral insertion or removal of cables. The forward web member includes a flange which is received within a plurality of retainer clips carried by the removable sidewall for stabilizing the forward end of the removable sidewall against lateral displacement. A channel-shaped latch is connected to the trailing edge of the removable sidewall and receives a locking bar member pivotally mounted on the trailing web for securing the removable sidewall in a cable dispensing position.

9 Claims, 5 Drawing Figures

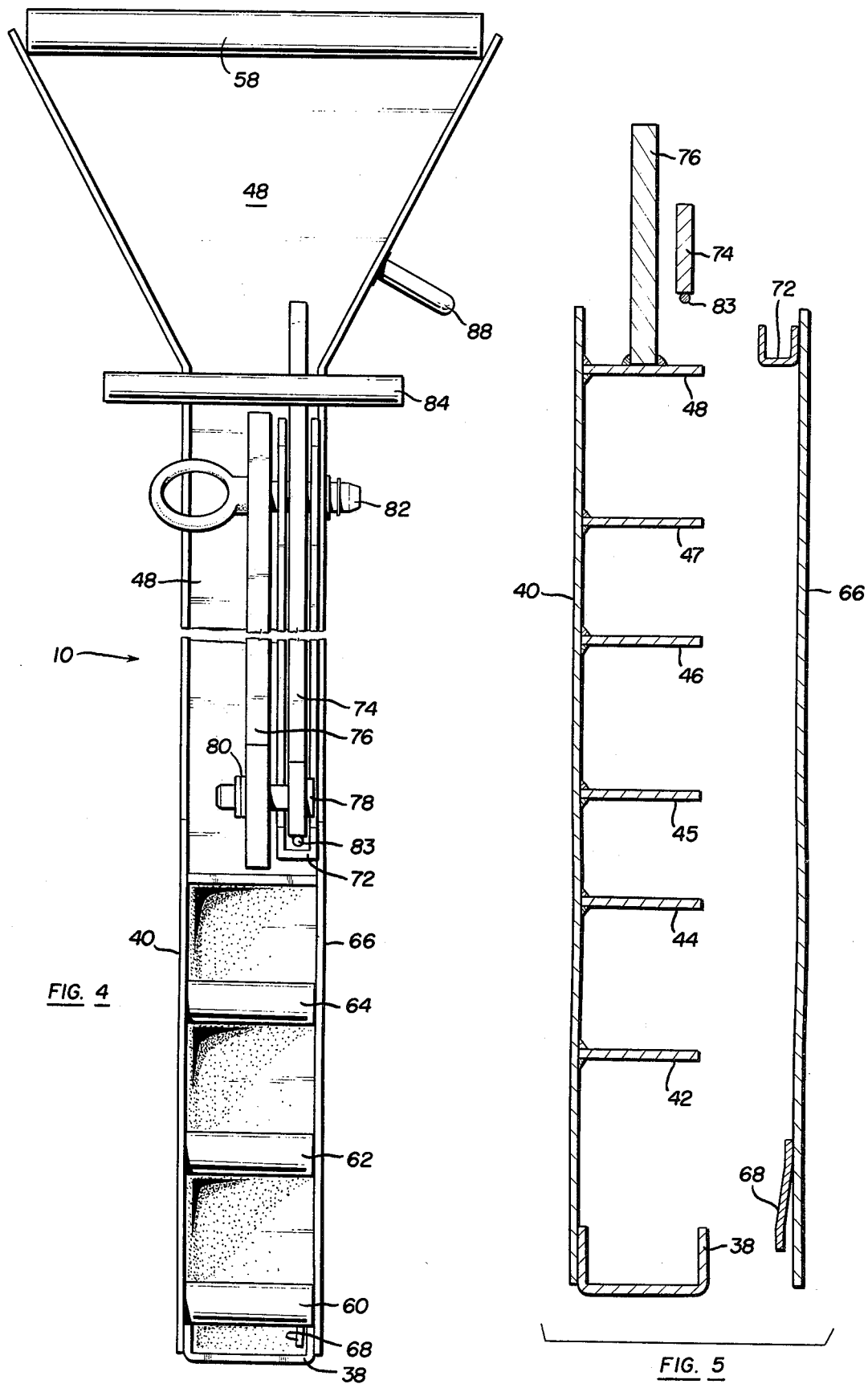

MULTIPLE CABLE CHUTE

BACKGROUND OF THE INVENTION

1. Field of the Invention

The present invention relates to a cable chute suitable for attachment to a ground slitting blade to dispense and position a plurality of cables in the ground. More particularly, the present invention relates to a cable chute having a removal sidewall component to enable lateral insertion or removable of cables.

2. The Prior Art

Various cable guiding chutes have been proposed by the prior art and include varying configurations and design. One very basic shortcoming in conventional cable chutes is the failure to provide an apparatus capable of (1) simultaneously guiding and laying a plurality of cables, or the like, without requiring a complicated structure, and (2) providing accessibility to the cable guiding conduits to remove, insert or replace cables as the need arises.

An example, of the prior art includes, first, U.S. Pat. No. 3,395,545 to Mendaloff, which discloses a cable guiding compartment that is releasably maintained within the chute. This patent, rather than suggesting the present invention, illustrates one of the basic problems in the art, i.e. nonaccessibility to the cable guiding conduits. Further, the suggested Mendaloff chute does not include the provision of cable guiding separators extending the length of the chute, thereby requiring additional guiding structure in the form of rollers.

Another example of prior art patents which broadly teach the idea of simultaneously guiding and laying a plurality of cables includes U.S. Pat. Nos. 3,222,876, and 3,338,060 to Harmstorf. These patents likewise do not teach the use of any structure to yield accessability to the guiding chutes to accomodate ease in removing or inserting cables or the like.

Several prior art patents include a general teaching of a removable component to provide accessibility to the interior of the cable guiding chute, examples of such prior art being U.S. Pat. Nos. 3,363,423 to Davis, 3,111,007 to Ryan, 3,405,533 to Fries and 3,417,571 to Kelley. It can readily be seem from these patents that there is no hint of the structure proposed by the present application which would yield accessibility to the interior of the cable chute capable of dispensing and guiding a plurality of cables or the like.

Yet another embodiment of a cable chute for dispensing a plurality of cables includes an arrangement consisting of a plurality of individual conduit members which may be connected to one another in a "piggy back" manner. This particular arrangement is highly undesireable for several reasons, including (1) inaccessibility to the interior of any one or more of the cable guiding conduits, (2) the requirement of mounting structure for attaching each individual cable guiding conduit, (3) the necessity of feeding cable longitudinally through the cable guiding conduit rather than by lateral insertion as proposed by the present invention, and (4) the time required for attaching each individual cable guiding conduit.

The present invention overcomes the shortcomings of the prior art cable chutes while providing numerous other advantages as will become apparent through study of the remaining portions of this application and through use of the suggested structure.

SUMMARY OF THE INVENTION

The present invention relates to a cable guiding and dispensing chute suitable for use with a ground slitting blade for placing a plurality of cables, plastic pipes or the like in vertically layered fashion within the ground.

The chute, per se, is a generally J-shaped box-like structure having an opening at an upper end thereof to receive a plurality of cables and a lower, rearwardly directed opening for a cable exit. The structural components of the chute include, among others: (a) a pair of spaced, generally vertical, J-shaped sidewalls, one of which is releaseably secured to the chute assembly to enable removal: (b) spaced forward and trailing spacer components extending between the sidewalls and being attached to the non-removable sidewall; and (c) a plurality of J-shaped divider components rigidly secured to the non-removable sidewall and extending from the cable entrance region to the cable exit region to define a plurality of cable guiding channels. The forward spacer component is formed from channel-shaped members having a pair of lateral flanges, one of which is rigidly secured to the non-removable sidewall. The other of the flanges releasably receives a plurality of retainer clips connected to the removable sidewall for lateral stabilization when that sidewall component is in the cable dispensing position.

To further secure the removable sidewall component in position, a latching mechanism is provided to interlock the trailing edge of the removable sidewall to the trailing spacer. That mechanism includes a channel-shaped member rigidly secured to the removable sidewall and having a lengthwise J-shaped configuration fitting closely adjacent to the rear surface of the trailing member. A J-shaped locking bar is pivotally mounted on a lower portion of the trailing channel and is positioned and configured to nestingly fit into the channel latching member to lock the removable sidewall member into position.

Thus, as the need arises to replace, remove, or insert cables into the chute channels, the removable sidewall may be separated from the remainder of the chute by simply, first, pivotally disengaging the locking bar from the channel shaped latching member, and second, lifting the removable sidewall to remove the retainer clips from engagement with the flanges of the forward spacer channel.

It can therefore be appreciated that the present invention affords several advantages, including: (1) expeditious removal or attachment of the removable sidewall to the remainder of the chute assembly, (2) accessibility to the cable guiding channels to enable lateral insertion or removal of cables therefrom; and (3) simplicity in construction of a multiple cable guiding chute.

BRIEF DESCRIPTION OF THE DRAWINGS

FIG. 4 is a rear elevational view of the cable chute, illustrating the locking mechanism proposed by the present invention for securing the removable side plate in position.

FIG. 5 is an exploded cross-sectional view taken along line 5—5 of FIG. 2, illustrating the removable sidewall component detached from the chute.

DETAILED DESCRIPTION OF THE INVENTION

Figure 1:
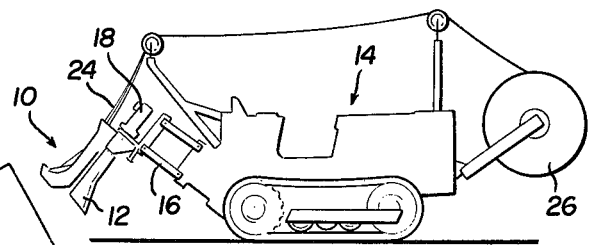
FIG. 1 is a side elevational view of the cable chute assembly proposed by the present invention in the environment of a crawler tractor and ground slitting blade.

The present invention relates specifically to an improved cable guiding and dispensing chute 10 which is designed preferably to be used in combination with a ground slitting implement in the form of a blade 12 as illustrated in FIG. 1. The ground slitting and cable dispensing assembly is suitable for attachment to a prime mover such as a crawler tractor 14 by way of an elevatable platform and support links 16, as more fully discussed in U.S. Pat. No. 3,363,423 to Davis, which is incorporated herein by reference.

As illustrated in FIG. 1, a power actuated blade reciprocating mechanism 18 is employed to vertically vibrate the blade 12 for cutting a slot in the ground, and includes, for example, a pair of counter-rotating eccentric masses which are commonly known in the trade as a Shaler Shaker. The cable dispensing chute itself is connected to the blade by longitudinally spaced links (designated in FIG. 2 by reference numerals 20 and 22) which are pivoted freely at their respective opposite ends to brackets on the blade and the chute to eliminate the transmission of vibratory motion. The blade preferably has a thickness which is similar to the thickness of the cable or pipe being dispensed and is slightly smaller than the width of the cable chute for purposes which are more fully discussed and explained in the aforementioned U.S. Pat. No. 3,363,423 to Davis.

The cables 24 which are being fed into the cable dispensing and guiding chute 10 may be dispensed from a plurality of parallel cable drums 26 (only one of which can be seen in FIG. 1) which are supported by conventional support structure on the crawler tractor.

Figure 2:
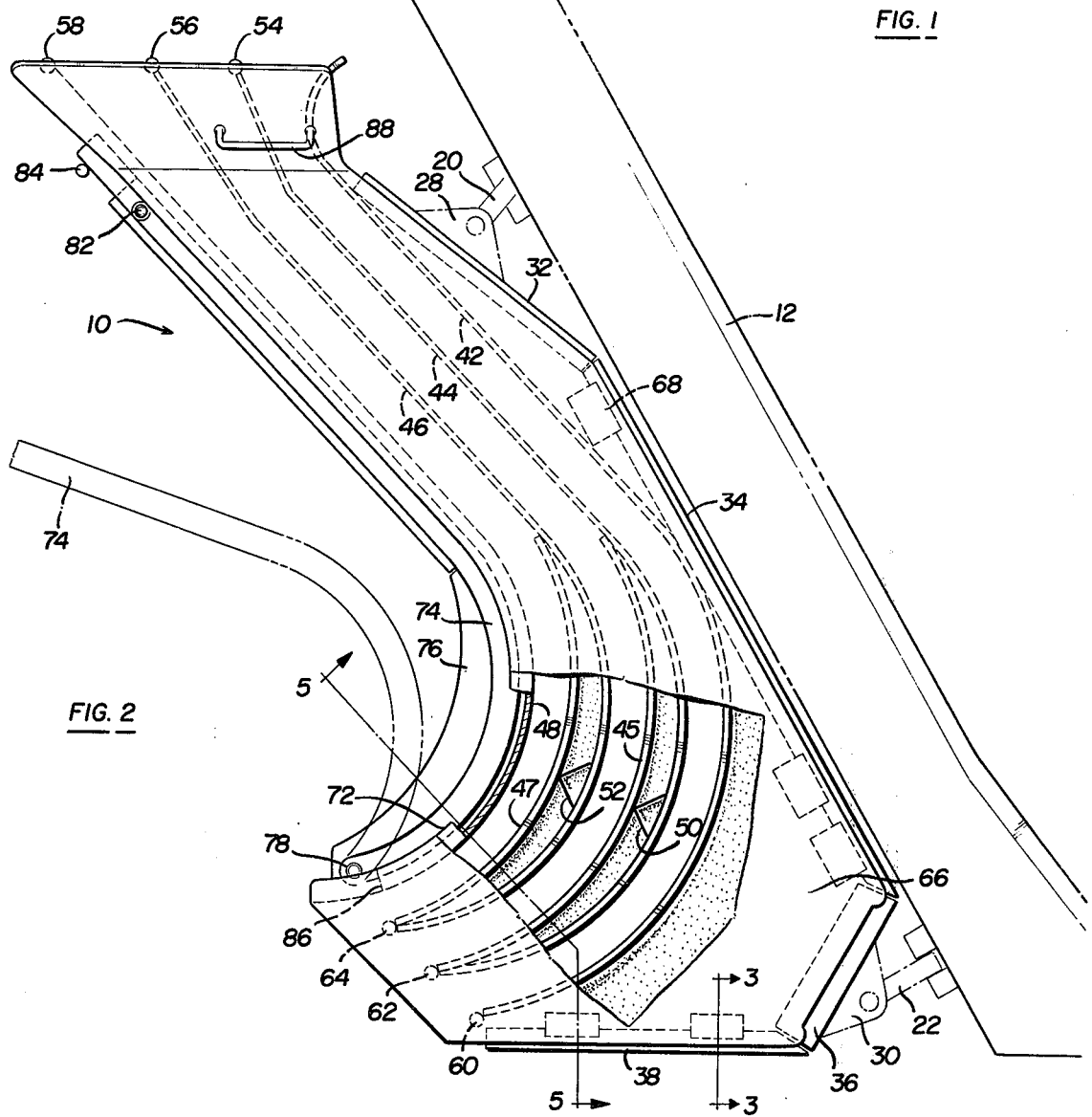
FIG. 2 is a side elevational view of the cable dispensing chute, illustrating the plurality of cable guiding channels and the interconnection between the removable sidewall component and the chute assembly.
Figure 3:
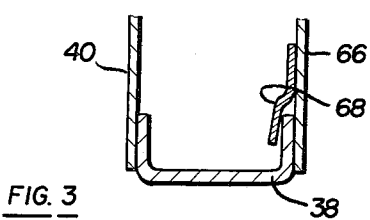
FIG. 3 is a sectional view along line 3—3 of FIG. 2.

Referring now to FIG. 2, the cable chute 10 is illustrated as being pivotally connected to the support links 20 and 22 by respective support brackets 28 and 30, which are rigidly mounted on a forward end wall or web. This web may be continuous to form both the forward and lower walls of the chute, or may consist of several web sections designated as 32, 34, 36 and 38. As will become apparent for resons set out in later portions of this disclosure, the web sections have a channel-shaped cross-sectional configuration (as illustrated in FIGS. 3, 4, and 5) and are assembled to form a generally J-shaped forward chute wall.

A first, generally J-shaped first sidewall 40 is connected to the web sections along its lower and forward edges and has rigidly connected thereto a plurality of primary dividers 42, 44, and 46 and a trailing end wall or web 48. As illustrated in FIG. 2, the primary dividers and the trailing end wall are generally J-shaped along their lengths and extend from an upper cable entrance region to a lower cable exit region to form a plurality of cable guiding channels. Auxiliary dividers 45 and 47 are connected to primary dividers 44 and 46, respectively, in the transition region of the cable channels to provide the desired radius of curvature for positioning the cables in a generally horizontal disposition for placement in the ground. Angle support members 50 and 52 are connected between dividers 44, 45 and 46, 47, respectively, to provide additional support to the dividers in the transition region.

A plurality of bars or rods 54, 56, 58, 60, 62, and 64 are connected to the ends of the dividers and the trailing web for the purpose of (1) reducing drag on the cables as they traverse the ends of the dividers and (2) eliminate the possibility of damage to the cables which might otherwise occur from the relatively sharp edges at the ends of the dividers. An additional feature provided by the present cable chute design is the enlarged upper ends of the dividers and the trailing web and the flaring out of the first sidewall member 40 to provide a funnel-shaped cable entrance region to enable cables to be reeled off a drum or fed from various points into the cable chute.

The advantages provided by the construction of the cable chute described to this point include, for example: (1) a simplicity in construction and design, and (2) supporting a plurality of cables along the entire length of the cable chute to thereby eliminate tangling and pressure of the cables upon one another. However, probably the most important advantage afforded by the present invention accrues through the provision of a removable sidewall member which is designated by reference numeral 66. Specifically, the advantage afforded by the removable sidewall member is the ability to gain accessibility to the interior of the cable guiding conduits so that cable may be laterally inserted into or removed from these conduits rather than having to be fed lengthwise thereof as required by the prior art.

The removable sidewall member 66 is similar in shape to the first sidewall member 38 since it has a J-shaped configuration and an upper, outwardly flaring section defining the other side of the funnel-shaped cable entrance region. The removable sidewall member 66 is retained on the forward end wall of the cable chute 10 by a plurality of retainer clips 68 which overlappingly engage the upwardly extending flange members of the separating web components 34 and 38. As best illustrated in FIGS. 3 and 5, the retainer clips are formed from tabs which are secured at one end to the removable sidewall plate 66 and are bent to form a depending free end which defines an entrance channel into which the flange of the separating webs is inserted.

The trailing edge of the removable sidewall component 66 is secured to the trailing web member 48 by a releaseable locking assembly which includes a J-shaped latch member 72 that is rigidly secured to the trailing edge region of the removable side plate 66. As can be seen from FIGS. 2, 4, and 5, the latch member has a configuration to closely fit adjacent the trailing web 48 and is channel-shaped in cross-section to receive a pivotally mounted locking bar 74 which has a complementary J-shaped lengthwise configuration. The locking bar 74 is pivotally mounted on a reinforcing gusset plate 76 rigidly secured to the trailing web 48 by a removable pin 78 that is releaseably retained within a hole in the gusset plate by retainer sleeves 80 or the like. The upper end of the locking bar is releaseably secured in a nesting position within the channel-shaped latch member 72 for securing the removable sidewall 66 in a cable dispensing position by a cotter pin 82 which fits through mating holes in the gusset plate 76 and the locking bar 74. It can be seen from FIGS. 4 and 5 that an optional bearing element 83 is connected to the locking bar 74 for abutment against the channel-shaped latch member 72. The bearing element 83 may take the form of a continuous resilient strand along the entire length of the locking bar or may be in the form of a plurality of ball bearing elements.

To remove the sidewall member 66 when it is positioned as illustrated in FIGS. 2, 3, and 4, one must simply remove the cotter pin 82 and manually grasp a handle bar 84 rigidly connected to the locking bar to downwardly pivot the locking bar out of its nesting position with the channel-shaped latch member 72. As shown in FIG. 2, the channel member 72 terminates at an end 86 away from the pivotal connection of the locking bar to enable removal of the sidewall components 66. Next, the handle 88 is manually grasped and the removable sidewall member 66 is lifted to disengage the retainer clips 68 from the flanges on the spacer channels. Once sidewall member 66 has been removed, the internal cable guiding channels are exposed to enable lateral insertion or remove of a plurality of cables. To reposition the sidewall member 66 into its cable dispensing position, the retainer clip 68 are inserted over the flanges of the spacer channels, the locking bar is pivoted into its nesting position with the channel-shaped latch component, and the cotter pin 82 is inserted through mating holes in the locking bar and the supporting gusset plate.

It can now be fully appreciated that the presently proposed cable chute assembly affords the several advantages previously set forth in the present disclosure. Other advantages and meritorious features will become apparent to those skilled in the art of cable laying operations.

The disclosed embodiment is merely exemplary of the overall invention presently proposed and is not intended to be limiting in any manner. To the contrary, it is intended that this application cover all equivalents to which it is entitled; for example, it is anticipated that some alternative to the present disclosed retainer clips could be employed to carry out the overall objectives herein.

Having fully and completely described by invention, I now claim:

1. In a cable guiding chute assembly including a pair of spaced, generally parallel vertical sidewalls; a set of spaced end walls between and generally perpendicular to said sidewalls, said end walls defining a passageway to receive generally vertically oriented cables and to guide said cables into a generally horizontal orientation for placement in the ground; and a plurality of dividers positioned between said set of end walls and being generally perpendicular to said sidewalls to define a plurality of cable guiding conduits within said passageway, said dividers having arcuate sections for guiding and dispensing a plurality of cables into said horizontal orientation, the improvement of one of said end walls including a flange adjacent to one of said sidewalls, said flange extending generally parallel to said one sidewall, a plurality of connector clips carried by said one sidewall and receiving said flange for releaseably interconnecting said one side wall to said one end wall, and a locking means carried by the other of said end walls for releaseably engaging a latch carried by said one sidewall, wherein said one sidewall may be removed from the chute assembly to expose the conduits to enable lateral removal, insertion or replacement of a plurality of cables.

2. The cable chute assembly defined in claim 1, wherein said latch is channel-shaped and overlies said other end wall, said locking means including a pivotally mounted bar nesting within said channel-shaped latch for securing the removable sidewall to the chute assembly.

3. The cable chute assembly defined in claim 2, characterized by said other end wall, said locking bar and said channel having a generally J-shaped lengthwise configuration.

4. In a cable guiding chute assembly including:
a pair of generally vertical sidewalls and a set of forward and trailing end walls extending between and being generally perpendicular to said sidewalls, said end walls being spaced and having a configuration to define a generally J-shaped passageway for a plurality of cables, and at least one separator extending along substantially the entire length of said passageway to define a plurality of cable guiding channels, the improvement of:
one of said sidewalls being removeable from the chute assembly and including means for (a) engaging one of said end walls and (b) stabilizing said one sidewall against lateral displacement from the chute assembly;
the other of said end walls having a J-shaped lengthwise configuration and being connected to the other of said sidewalls;
a channel-shaped latch carried by the removeable sidewall, said latch having a generally J-shaped lengthwise configuration overlying and extending substantially the entire length of said other end wall and opening away from said other end wall, and;
a pivotally mounted locking bar carried by said other end wall and having a generally J-shaped lengthwise configuration nesting within said channel-shaped latch to releaseably maintain the removeable sidewall on said chute assembly, wherein the removeable sidewall may be displaced from the chute assembly upon disengagement of the locking bar from the latch to expose the cable guiding channels for lateral insertion or displacement of cables.

5. The cable chute as defined in claim 4, characterized by said one end wall including a flange projecting toward said other end wall and being generally parallel with and adjacent to said removeable sidewall; and said engaging and stabilizing means including a plurality of retainer plates connected to said removeable sidewall and defining therewith channels receiving said flange.

6. The cable chute assembly defined in claim 5, furthering including a reinforcing plate connected to said other end wall and being generally parallel with said locking bar; said plate and locking bar including mating holes through which a cotter pin is inserted to releaseably maintain the locking bar within said channel-shaped latch.

7. The cable chute assembly defined in claim 6, characterized by said separator having a generally J-shaped lengthwise configuration.

8. The cable chute assembly defined in claim 5, characterized by said flange including generally horizontally and vertically directed sections, and at least one of said retainer plates engaging each of said sections to stabilize said removeable sidewall against displacement in at least two directions.

9. In a cable chute suitable for attachment to a trenching blade for guiding and dispensing a plurality of cables, pipes or the like, including:
a first, generally vertical, J-shaped sidewall member;
generally J-shaped, spaced forward and trailing webs carried by and generally perpendicular to said first sidewall member defining a passageway for a plurality of cables; said forward web terminating at its distal edge away from said first sidewall member in a flange generally parallel to said first sidewall member and projecting generally toward said trailing web; a plurality of separators carried by said first sidewall member, said separators being generally parallel with said trailing web and extending substantially the length of said passageway to define a plurality of cable guiding and dispensing channels, wherein the improvement comprises:

a generally vertical, removeable sidewall member having a configuration substantially the same as said first sidewall member and abutting against outwardly directed, generally vertical surfaces on said flange and said trailing web;

a plurality of retainer clips connected to said removeable sidewall member and defining therewith an entrance channel receiving said flange to stabilize said removeable sidewall member on the chute assembly against lateral displacement;

a generally J-shaped channel member carried by said removeable sidewall and overlying a portion of said trailing web; and a generally J-shaped locking bar pivotally connected to said trailing web and nesting within said J-shaped channel member for securing said replaceable sidewall in abutting relationship against said flange and trailing web, and means releaseably maintaining said locking bar in nested arrangement with said channel member, wherein said removeable sidewall may be displaced upon disengagement of said maintaining means and said locking bar for exposing said cable guiding channels to enable lateral removal, insertion or replacement of a plurality of cables.

* * * * *